(12) United States Patent
Lu

(10) Patent No.: US 8,690,169 B2
(45) Date of Patent: Apr. 8, 2014

(54) DETACHABLE ROLLER MEANS AND MOVABLE BAG OR CASE

(75) Inventor: Qiang Lu, Zhejiang (CN)

(73) Assignee: Hangzhou Gema Suitcases & Bags Co., Ltd., Zhejiang (CN)

( * ) Notice: Subject to any disclaimer, the term of this patent is extended or adjusted under 35 U.S.C. 154(b) by 520 days.

(21) Appl. No.: 13/056,124

(22) PCT Filed: Nov. 24, 2009

(86) PCT No.: PCT/CN2009/001309
§ 371 (c)(1),
(2), (4) Date: Jan. 27, 2011

(87) PCT Pub. No.: WO2010/139101
PCT Pub. Date: Dec. 9, 2010

(65) Prior Publication Data
US 2011/0127738 A1 Jun. 2, 2011

(30) Foreign Application Priority Data
Jul. 2, 2009 (CN) .......................... 2009 1 0100175

(51) Int. Cl.
*B60B 33/00* (2006.01)

(52) U.S. Cl.
USPC .............................. 280/79.2; 280/47.17; 16/30

(58) Field of Classification Search
USPC ............. 280/47.131, 47.17, 47.18, 63, 79.11, 280/79.2; 190/18 A; 16/29, 30
See application file for complete search history.

(56) References Cited

U.S. PATENT DOCUMENTS 4,385,415 A * 5/1983 Volz .................................. 16/29
8,251,391 B2 * 8/2012 Kohler et al. ............... 280/250.1

FOREIGN PATENT DOCUMENTS

| CN | 2443641 Y | | 8/2001 |
| CN | 2651018 Y | | 10/2004 |
| CN | 201148101 Y | | 11/2008 |
| WO | WO 2007/066256 | * | 6/2007 |

* cited by examiner

*Primary Examiner* — Katy M Ebner
(74) *Attorney, Agent, or Firm* — Birch, Stewart, Kolasch & Birch, LLP

(57) ABSTRACT

The present invention relates to a detachable roller means and a movable bag or case having said detachable roller means, said roller means comprises a roller seat (1) and a roller assembly, which are detachably connected to each other. The roller seat has a penetration opening (1-1) and a guide in which a spring-pretensioned button plate (2-10) is guided. Said button plate has a button arm (2-3), by means of which the button plate is displaceable along the guide. The roller assembly has a roller holder and a roller (3). The roller holder is provided on its upper side with a lug boss (2-5) and a shaft (2-8) projecting from the lug boss. The shaft is provided with an upper stop (2-9). In a mounting status, the lug boss is abutted against the bottom of the roller seat tightly and, viewed in the insertion direction of the shaft, the button plate is engaged behind the upper stop in a spring-pretensioned manner. The button plate can be brought out of engagement with the upper stop in opposite to the spring pretension. The roller means according to the present invention is not only permanently firm, but also can be mounted and detached easily.

20 Claims, 5 Drawing Sheets

DETACHABLE ROLLER MEANS AND MOVABLE BAG OR CASE

FIELD OF INVENTION

The present invention relates to a detachable roller means and a movable bag or case having said detachable roller means.

BACKGROUND OF INVENTION

Nowadays the life is increasingly rich and various. A bag or case, in particular a movable bag or case having universal corner rollers, is usually necessary at work, in sports, in recreation or the like. However, when the work or travel is finished, the bag shall be packed in a proper way, but the bag with rollers is hardly to be fixed. When a user goes outdoors for sports, for instance, going fitness, golf, swimming or the like, which does not require too much things, and the user doesn't want to carry a bag by hand, the user can take a bag with rollers for an easy trip. Now there are bags or cases with universal corner rollers that are fixed on the bag body or case body. No matter how many degrees the rollers rotate, they are not detachable. Such bags or cases have bad adaptability during the application. Besides, rollers are worn out most quickly among all of the components of a bag or case. When the other parts of the bag or case are still in normal state, but the worn rollers are out of use, it would be impossible that the user replaces the worn rollers with new ones by himself, since the rollers cannot be detached.

Moreover, a detachable roller means in a snap-fit manner is known in the prior art, wherein the snap-fit arrangement should be designed extremely firm, for preventing the rollers from falling off unintentionally under an external load. It usually requires tools or a great effort to loose the snap-fit arrangement. And the firmness of the snap-fit arrangement is reduced with the times of the actuation to the snap-fit arrangement.

SUMMARY OF INVENTION

The present invention is based on the object of providing a detachable roller means and a movable bag or case having said detachable roller means, wherein the detachable roller means can not only permanently prevent a roller from an unintentional falling off, but also allow an easy montage and detachment.

This object is reached according to the invention by a detachable roller, which comprises a roller seat and a roller assembly, the roller assembly and the roller seat being connected to each other detachably, wherein the roller seat has a penetration opening, a guide on the upper side of the roller seat being transverse to the penetration opening, in particular perpendicular to the penetration opening, a spring-pretensioned button plate being guided in the guide, said button plate having a button arm which extends through a button through hole in the roller seat and can be actuated from outside, wherein by the actuation of the button arm the button plate is displaceable along the guide, wherein the roller assembly has a roller holder and a roller mounted thereon rotatably about a roller axis, a lug boss and a shaft projecting from said lug boss for inserting into the penetration opening being arranged on the upper side of the roller holder, an upper stop being arranged on the shaft, wherein in a mounting status, the lug boss of the roller assembly is abutted against the bottom of the roller seat and, viewed in the insertion direction of the shaft, the button plate is engaged behind the upper stop of the roller assembly in a spring-pretensioned manner, and the button plate can be brought out of engagement with the upper stop in opposite to the spring pretension.

For the detachable roller means according to the invention, the roller assembly can be mounted easily as below: the button arm is moved away laterally by one hand and then the roller assembly is inserted in position by the other hand, and then the button arm is released. In the mounting status, a permanent and firm connection between the roller assembly and the roller seat is accomplished by means of an interaction between the button plate pretensioned by the spring and the upper stop, as well as by means of an abutment of the lug boss against the bottom of the roller seat, in order to prevent the rolling assembly from falling off unintentionally. In case it is necessary to detach the roller assembly, it only needs to push the button plate away laterally by one hand so as to get the roller assembly off by the other hand without any trouble. The roller assembly is also easily to be exchanged in the event of the wear of the roller.

In a preferable embodiment, said detachable roller means is configured as a detachable universal roller means, that is to say, the roller holder is freely rotatable about a longitudinal axis. The universal performance of the roller means denotes the free rotation of the roller holder about the longitudinal axis. It can be carried out in various manners, and is well-known in the prior art. For example, the roller holder is freely rotatable about a longitudinal axis defined by said shaft, in particular an axis substantially perpendicular to the roller axis. In a favorable structure, the lug boss is connected to the shaft in an anti-rotary manner, and the roller holder is rotatable about the shaft. In an alternative structure, the roller holder is connected to the shaft in an anti-rotary manner, while the shaft is freely rotatable in the penetration opening. Besides, a limited rotation or non-rotation of the roller holder about the longitudinal axis is also considerable.

In a preferable embodiment, viewed in the insertion direction of the shaft, the shaft has an intermediate stop behind the upper stop, and the distance between the upper stop and the intermediate stop is equal to the thickness of the button plate. Therefore, the button plate is engaged into the space between the upper stop and the intermediate stop in the mounting status, and contacts the top and intermediate stop simultaneously, and thus it is advantageous for holding the shaft axially in a particularly firm manner.

In a preferable embodiment, the shaft is provided with a circumferential groove, the upper and lower walls thereof respectively constitute the upper stop and the intermediate stop, and the button plate has an arcuate recess corresponding to the shape of the groove.

In a preferable embodiment, the roller seat has a depression on its lower side, and the lug boss of the roller assembly has a complementary shape to the depression, and the depression and the lug boss are abutted against each other in the mounting status.

In a preferable embodiment, the lug boss of the roller assembly and the depression of the roller seat have a planar abutment surface and a non-circular cross section respectively. According to this embodiment not only the shaft is axially positioned in a particularly reliable mariner, but also the lug boss is held in an anti-rotary manner, and thus a small structure size is realized.

In a preferable embodiment, the spring is arranged in the direction of the guide, wherein one end of the spring is fixed to the button plate, in particular to a protrusion on the button plate, and the other end of the spring is fixed to a spring fixing means, which is arranged in the roller seat and is preferably configured as a protrusion or a dent.

In a preferable embodiment, a button external part is arranged in the button through hole, and said button external part is connected to the button arm or integrated with the same. By actuating the button external part, the button plate is displaceable along the guide. The button plate can be actuated friendly by means of the button external part.

In a preferable embodiment, a detachable, in particular in a thread-connection manner detachable, shell cover is provided on the upper side of the roller seat, for covering the parts in the roller seat. The detachable shell cover is beneficial to the servicing of the parts in the roller seat, in particular the spring therein. For example, when the spring is out of service or some foreign matter enters into the roller seat, the exchange of the spring or removal of the foreign matter can be implemented by opening the shell cover, so as to prevent the roller seat from the malfunction and therefore prevent the entire roller means from the malfunction.

In a preferable embodiment, the roller seat is connected detachably to the bag or case, in particular in a threaded connection manner.

The object of the present invention is also reached by a movable bag or case, which has a detachable roller means according to the invention, wherein the roller seat is mounted on the bag or case, in particular in a threaded connection with the bag or case.

In a preferable embodiment, at each of the two sides on the bottom of the bag or the case a detachable roller means is provided respectively.

BRIEF DESCRIPTION TO THE DRAWINGS

DETAILED DESCRIPTION TO THE DRAWINGS

Figure 1:
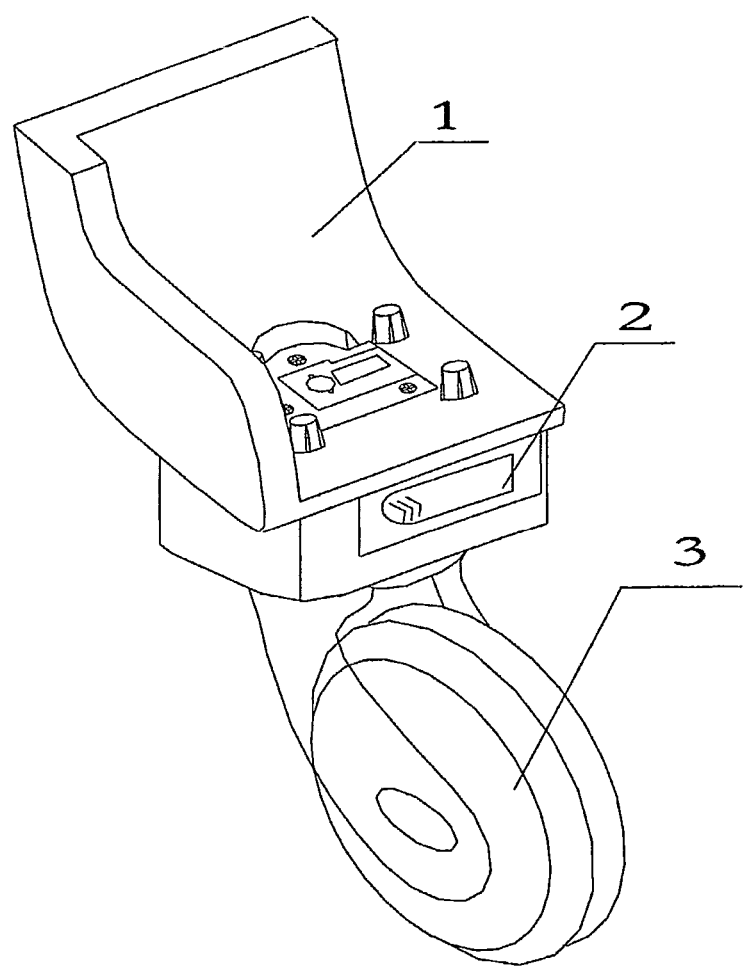
FIG. 1 shows a schematic respective of a detachable roller means according to the invention.
Figure 2:
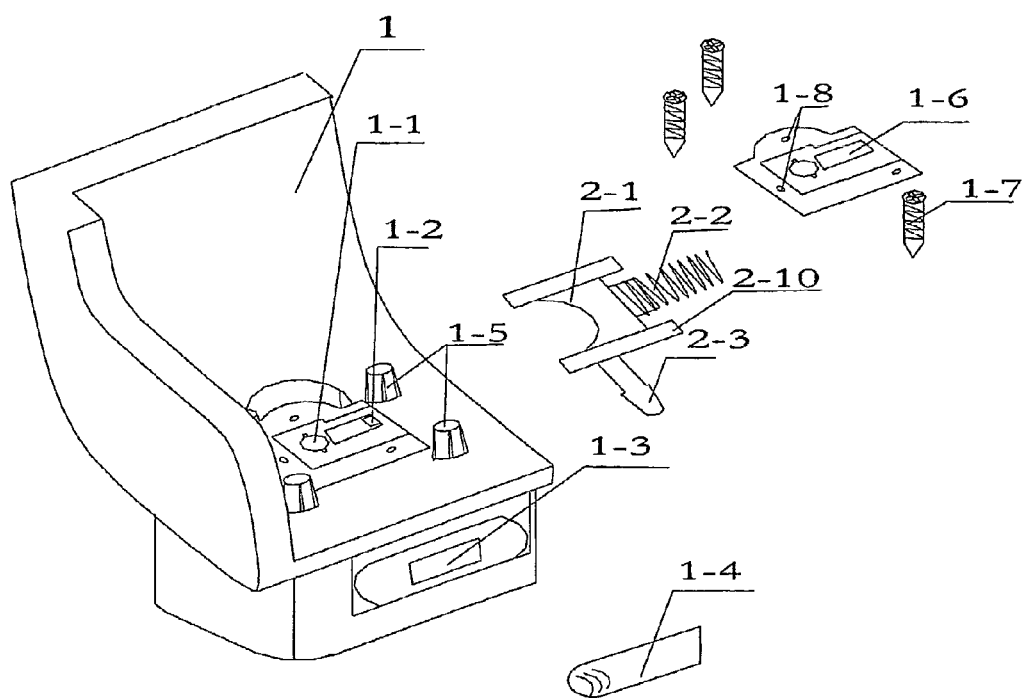
FIG. 2 shows a schematic respective of a roller seat of the detachable roller means according to the invention.
Figure 3:
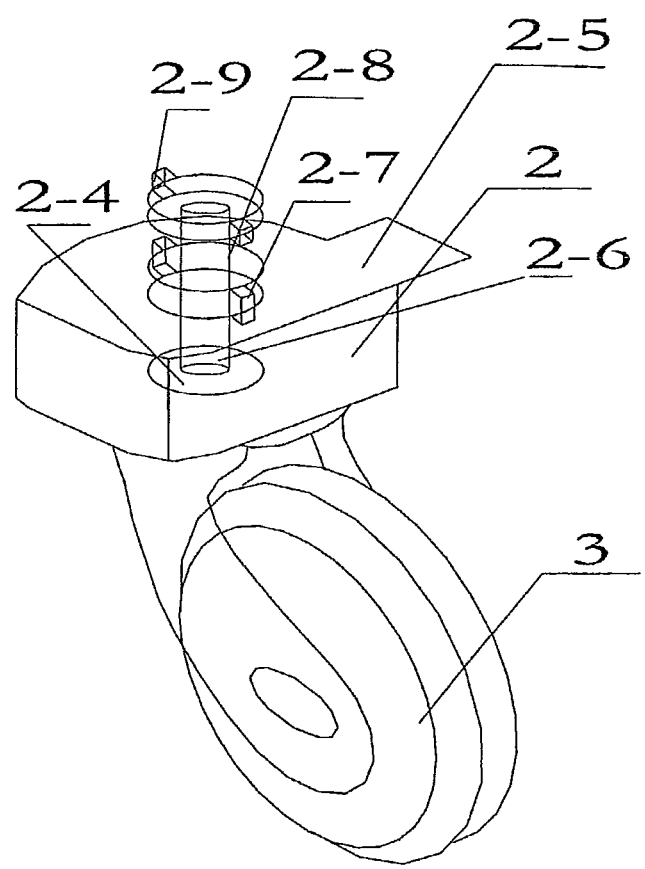
FIG. 3 shows a schematic respective of a roller assembly of the detachable roller means according to the invention.
Figure 4:
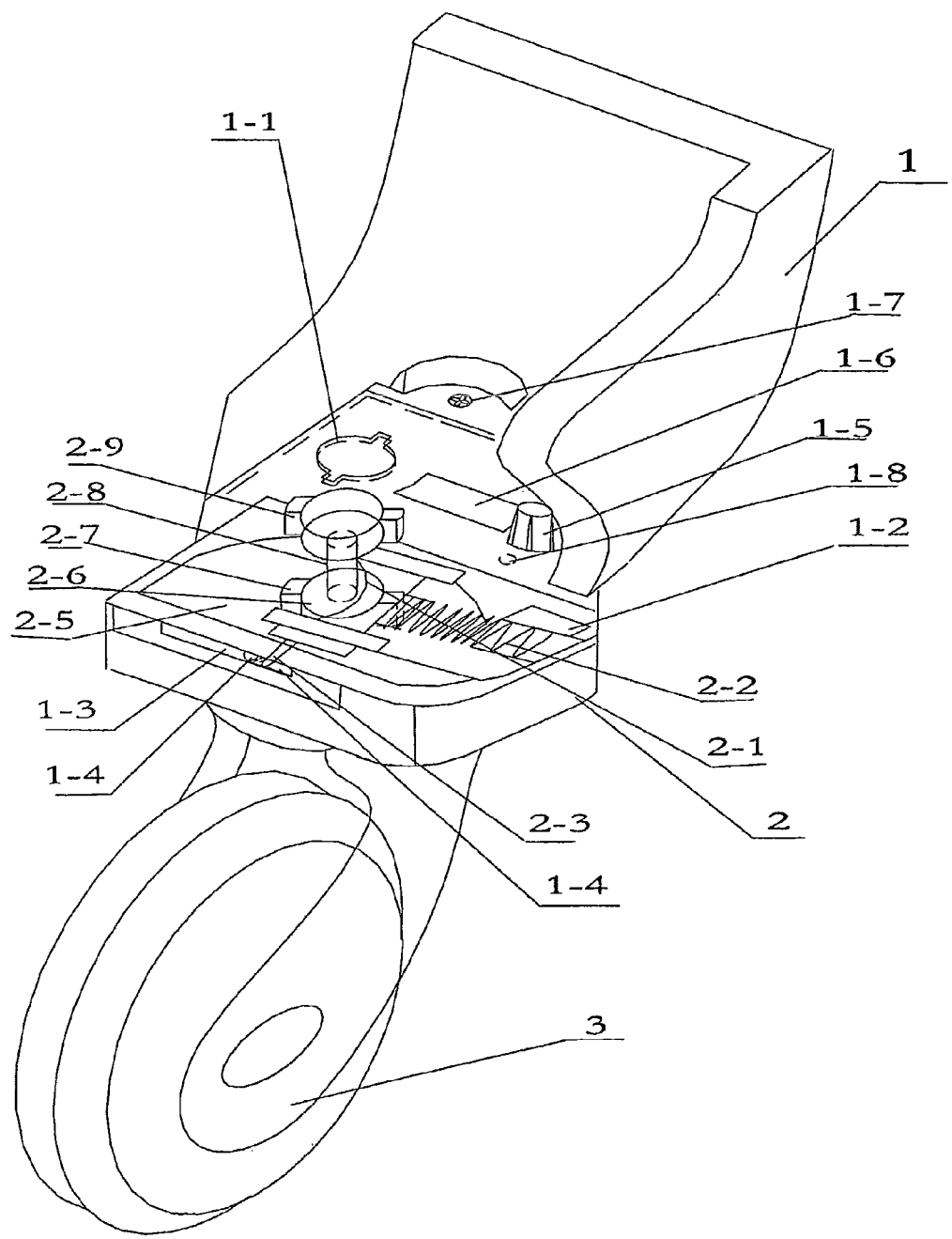
FIG. 4 shows a schematic respective of parts of the detachable roller means according to the invention in a partially exploded view.

An embodiment of the invention will be explained in detail below with reference to the appended drawings, in which the roller means of the invention is configured as a detachable universal corner roller means, and at two corners of the case body a roller means, as a corner roller means in the present embodiment, is arranged respectively. It is also considerable that the detachable roller means according to the invention is also arranged at any other position of the case body.

As shown in the figures, said detachable universal corner roller means substantially includes a roller seat 1 (hereby a corner roller seat), which is connected and fixed to the case body via screws 1-5. Said corner roller seat 1 is provided with a roller 3 on its lower side and is connected to the roller 3 through a connection means 2. Said corner roller seat 1 is provided with a shell cover 1-6 on its upper side, wherein the shell cover 1-6 is configured to be arcuate for facilitating the movement of an internal spring 2-2, and the shell cover 1-6 is fixed to the corner roller seat 1 by means of screws 1-7 and screw bores 1-8. A penetration opening 1-1 is arranged in the corner roller seat, and a button through hole 1-3 is arranged on the lateral side of the corner roller seat 1, and a button external part 1-4 is provided in the button through hole 1-3. The connection means 2 is provided with a lug boss 2-5, with a rotational head means 2-6 in the interior, which extends through the penetration opening 1-1 and the lug boss 2-5, as well as with a shaft 2-8 in the rotational head means 2-6. Said shaft 2-8 is provided with an upper stop 2-9 and an intermediate stop 2-7, and with a disc 2-4 on its bottom, wherein the shaft 2-8 connects the rotational head means 2-6 with the roller 3. The intermediate stop 2-7 is positioned above the lug boss 2-5. The button plate 2-10 is movably arranged in a guide that is transverse to the penetration opening 1-1 in the corner roller seat 1, wherein said guide is particularly configured as a linear guide. The button plate 2-10 is located between the upper stop 2-9 and the intermediate stop 2-7 along the vertical direction. The button plate 2-10 is provided with an arcuate recess 2-1, which can be engaged with the rotational head means 2-6. The spring 2-2 is connected to the button plate 2-10, wherein with one end the spring 2-2 is fixed to the button plate 2-10, and with the other end it is fixed to a spring fixing means 1-2 in the corner roller seat 1. The button plate 2-10 is provided with a button arm 2-3 that is connected to the button external part 1-4, wherein the design of the button external part 1-4 facilitates the actuation.

The roller means of the invention is substantially made of plastics, while the button plate 2-10, the button external part 1-4 and the shaft are preferably made of stainless steel, or metal coated with an anticorrosive layer, or any other corrosion-resistant metal.

The shaft 2-8 and the penetration opening 1-1 can have an arbitrary but appropriate cross-section, e.g. a circular or quadrate cross-section. Preferably, the profile of the shaft 2-8 and that of the penetration opening 1-1 are configured to be fitted to each other, thereby the radial orientation of the shaft 2-8 in the penetration opening also can be realized by the fit of the both. The anti-rotational fixing of the shaft in the penetration opening can also be realized by the non-circular cross-section of the shaft 2-8 and of the penetration opening 1-1.

Figure 5:
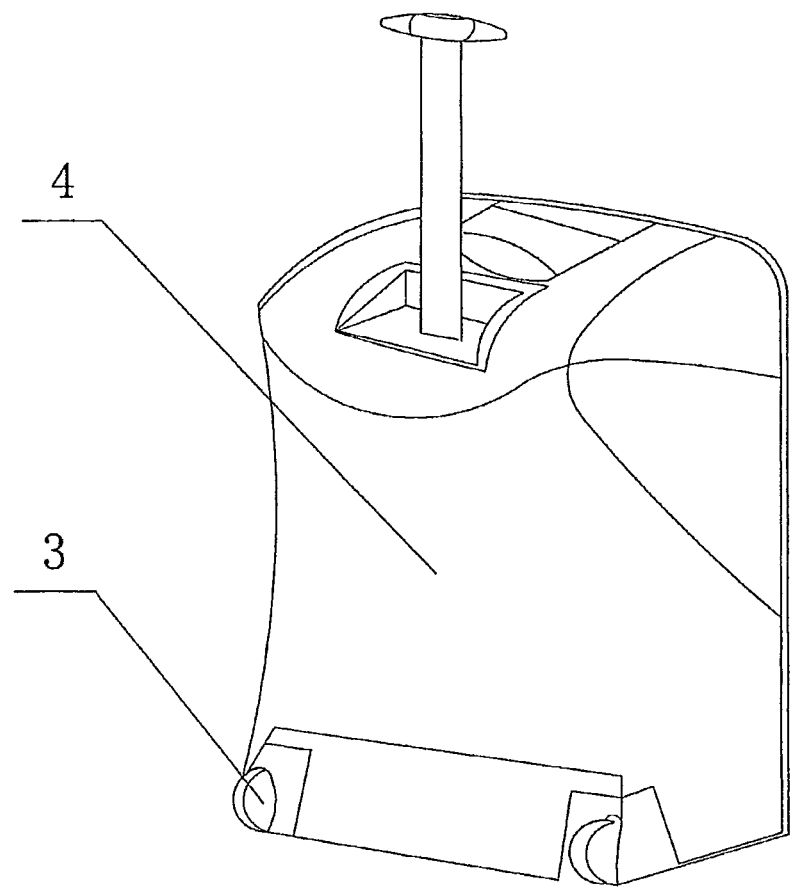
FIG. 5 shows a schematic respective of a movable bag or case according to the invention.

As shown in FIG. 5, the detachable corner roller means in the invention is used for a movable bag or a movable case, wherein a corner roller seat 1 as mentioned above is provided respectively at each of the two sides of the bottom of the case body 4.

When the roller assembly (the corner roller assembly in the embodiment shown in the figures) should be detached from the case body, the button external part 1-4 is pushed away by one hand laterally. Since the button external part 1-4 is connected to the button arm 2-3, the spring 2-2 connected to the button plate 2-10 is compressed, thus the arcuate recess 2-1 in the button plate 2-10 is disengaged with the rotational head means 2-6, and meanwhile the roller 3 is pulled out by the other hand, whereby the roller assembly is detached from the bag or case without a great effort. When the roller assembly should be mounted thereon, the button external part 1-4 is pushed away laterally by one hand, and meanwhile the roller assembly is inserted into the penetration opening 1-1 of the corner roller seat by the other hand. When the roller assembly is located in position, the button external part 1-4 is released, and the roller assembly is now mounted on the corner roller seat 1.

The detachable structure facilitates an arbitrary montage or detachment of the roller assembly in the usage. When a roller is worn out, the roller assembly with this roller is detached and replaced by a new one favorably, without hindering the usage of other parts in the case body.

In addition to the aforesaid exemplar embodiment, equivalents or variants having a comparable effect all fall into the scope sought for protection by the invention. For example, different from the embodiment as illustrated in the figures, in which the button plate 2-10, the shell cover 1-6 etc. are arranged on the upper side of the roller seat 1, in another embodiment they can also be arranged on the lower side of the roller seat 1. In this situation, the roller seat is closed on its upper side, and is provided with a guide and a button plate 2-10 on its lower side, and the shell cover 1-6 downwardly substantially covers the roller seat 1, and the shell cover 1-6 correspondingly has a penetration opening 1-1, and is directly abutted against the lug boss 2-5 in a mounting status, and for example, the bottom of the shell cover 1-6 is also provided with a depression fitted to the profile of the lug boss 2-5. Besides, it also pertains to an equivalent arrangement that the guide is not arranged in the basis of the roller seat but in the shell cover.

LIST OF REFERENCE NUMERALS

1 corner roller seat
1-1 penetration opening
1-2 spring fixing means
1-3 button through hole
1-4 button external part
1-5 screw
1-6 shell cover
1-7 screw
1-8 screw bore
2 connection means
2-1 arcuate recess
2-2 spring
2-3 button arm
2-4 disc
2-5 lug boss
2-6 rotational head means
2-7 intermediate stop
2-8 shaft
2-9 upper stop
2-10 button plate
3 roller
4 case body

The invention claimed is:

1. Detachable roller means, comprising:
a roller seat, and
a roller assembly,
wherein the roller assembly and the roller seat are detachably connected to each other,
wherein the roller seat includes:
a penetration opening,
a guide extending in a transverse direction with respect to the penetration opening, the penetration opening being arranged on an upper side of the roller seat,
a button plate that has been pre-tensioned by a spring is guided in the guide, and the button plate being integrally provided with a button arm which extends through a rectangular-shaped button through hole cut into a flat front face of the roller seat, the button arm being actuated by being pushed from outside, and the button plate being displaceable along the guide by actuating the button arm,
wherein the roller assembly includes:
a roller holder, and
a roller rotatably mounted in the roller holder about a roller axis,
the roller holder including:
a lug boss on an upper side thereof, and
a shaft projecting from the lug boss and serving to insert into the penetration opening,
an upper stop arranged on the shaft,
wherein in a mounting status, the lug boss of the roller assembly is abutted against an upper surface of a bottom of the roller seat, and
when viewed in an insertion direction of the shaft, the button plate is seen to be engaged in front of the upper stop of the roller assembly in a spring-pretensioned manner, and the button plate is able to be disengaged from the upper stop in a direction opposite to a spring pretensioned position.

2. The detachable roller means according to claim 1, wherein the detachable roller means is configured as a universal roller means, wherein the roller holder is freely rotatable about a longitudinal axis.

3. The detachable roller means according to claim 2, wherein the shaft has an intermediate stop that, when viewed in the insertion direction of the shaft, is located in front of the upper stop, wherein a distance between the upper stop and the intermediate stop is equal to a thickness of the button plate.

4. The detachable roller means according to claim 3, wherein a circumferential groove is provided in the shaft,
upper and lower walls of the groove are configured as the upper stop and the intermediate stop respectively, and
the button plate has an arcuate recess, the shape of which is fitted to the shape of the groove.

5. The detachable roller means according to claim 1, wherein the roller seat includes a depression on a lower side thereof, and the lug boss of the roller assembly has a shape complementary to that of the depression,
wherein the lug boss and the depression are abutted against each other in a mounting status.

6. The detachable roller means according to claim 5, wherein each of the lug boss of the roller assembly and the depression of the roller seat includes a planar abutment surface and a non-circular cross section.

7. The detachable roller means according to claim 1, wherein the spring is arranged in a direction of the guide,
wherein one end of the spring is fixed to a protrusion of the button plate, and
an opposite end of the spring is fixed to a spring fixing means located in the roller seat, the spring fixing means being configured as a protrusion or a dent.

8. The detachable roller means according to claim 1, wherein a button external part is arranged in the button through hole,
wherein the button external part and the button arm are connected to each other or configured as one piece,
wherein the button plate is displaceable along the guide by actuating the button external part.

9. The detachable roller means according to claim 1, wherein the roller seat is provided on an upper side thereof with a shell cover for covering parts of the roller seat, wherein the shell cover is threadedly detachable.

10. The detachable roller means according to claim 1, wherein the roller seat is detachably connected to a movable bag or a case.

11. The detachable roller means according to claim 10, wherein the roller seat is mounted on the movable bag or case in a threadedly detachable manner.

12. The detachable roller means according to claim 11, wherein each of two sides of a bottom of the bag or case is provided with one of the detachable roller means.

13. The detachable roller means according to claim 2, wherein the roller seat includes a depression on a lower side thereof, and the lug boss of the roller assembly has a shape complementary to that of the depression,
wherein the lug boss and the depression are abutted against each other in a mounting status.

14. The detachable roller means according to claim 3,
wherein the roller seat includes a depression on a lower side thereof, and the lug boss of the roller assembly has a shape complementary to that of the depression,
wherein the lug boss and the depression are abutted against each other in a mounting status.

15. The detachable roller means according to claim 4,
wherein the roller seat includes a depression on a lower side thereof, and the lug boss of the roller assembly has a shape complementary to that of the depression.,
wherein the lug boss and the depression are abutted against each other in a mounting status.

16. The detachable roller means according to claim 2,
wherein the spring is arranged in a direction of the guide,
wherein one end of the spring is fixed to a protrusion of the button plate, and
an opposite end of the spring is fixed to a spring fixing means located in the roller seat, the spring fixing means being configured as a protrusion or a dent.

17. The detachable roller means according to claim 3,
wherein the spring is arranged in a direction of the guide,
wherein one end of the spring is fixed to a protrusion of the button plate, and
an opposite end of the spring is fixed to a spring fixing means located in the roller seat, the spring fixing means being configured as a protrusion or a dent.

18. The detachable roller means according to claim 4,
wherein the spring is arranged in a direction of the guide,
wherein one end of the spring is fixed to a protrusion of the button plate, and
an opposite end of the spring is fixed to a spring fixing means located in the roller seat, the spring fixing means being configured as a protrusion or a dent.

19. The detachable roller means according to claim 5,
wherein the spring is arranged in a direction of the guide,
wherein one end of the spring is fixed to a protrusion of the button plate, and an opposite end of the spring is fixed to a spring fixing means located in the roller seat, the spring fixing means being configured as a protrusion or a dent.

20. The detachable roller means according to claim 6,
wherein the spring is arranged in a direction of the guide,
wherein one end of the spring is fixed to a protrusion of the button plate, and
an opposite end of the spring is fixed to a spring fixing means located in the roller seat, the spring fixing means being configured as a protrusion or a dent.

\* \* \* \* \*